United States Patent
Shirai et al.

(10) Patent No.: US 11,518,477 B2
(45) Date of Patent: Dec. 6, 2022

(54) ACTUATION CONTROLLER AND ACTUATION SYSTEM

(71) Applicant: SHIMANO INC., Sakai (JP)

(72) Inventors: Toyoto Shirai, Sakai (JP); Yuki Sakagawa, Sakai (JP); Norikazu Taki, Sakai (JP); Akihiro Nozaki, Sakai (JP); Noor Ashyikkin Binti Mohd Noor, Sakai (JP)

(73) Assignee: SHIMANO INC., Sakai (JP)

( * ) Notice: Subject to any disclaimer, the term of this patent is extended or adjusted under 35 U.S.C. 154(b) by 557 days.

(21) Appl. No.: 16/427,452

(22) Filed: May 31, 2019

(65) Prior Publication Data

US 2020/0377176 A1    Dec. 3, 2020

(51) Int. Cl.

| | |
|---|---|
| *B62K 23/00* | (2006.01) |
| *B62J 45/00* | (2020.01) |
| *B62J 45/40* | (2020.01) |
| *B62M 25/08* | (2006.01) |
| *B62M 9/124* | (2010.01) |
| *B62M 25/00* | (2006.01) |

(52) U.S. Cl.
CPC ............ *B62M 25/08* (2013.01); *B62K 23/00* (2013.01); *B62J 45/00* (2020.02); *B62J 45/40* (2020.02); *B62M 2009/12413* (2013.01); *B62M 2025/006* (2013.01)

(58) Field of Classification Search
CPC ........ B62J 1/00; B62J 2001/085; B62J 45/00; B62J 45/20; B62J 45/40; B62J 1/10; B62K 19/36; B62K 23/00
See application file for complete search history.

(56) References Cited

U.S. PATENT DOCUMENTS

| | | | | |
|---|---|---|---|---|
| 8,016,349 B2* | 9/2011 | Mouri | ............... | B62K 19/36 |
| | | | | 297/215.13 |
| 8,091,910 B2* | 1/2012 | Hara | ............... | B62K 25/04 |
| | | | | 280/283 |
| 8,136,877 B2* | 3/2012 | Walsh | ............... | B62J 1/06 |
| | | | | 297/215.13 |
| 8,246,065 B1* | 8/2012 | Kodama | ............... | B62J 1/08 |
| | | | | 280/287 |
| 8,317,261 B2* | 11/2012 | Walsh | ............... | B62J 1/10 |
| | | | | 297/215.13 |

(Continued)

FOREIGN PATENT DOCUMENTS

| | | |
|---|---|---|
| EP | 2 657 113 A2 | 10/2013 |
| EP | 2657113 A2 | 10/2013 |
| TW | M378163 U1 | 4/2010 |

*Primary Examiner* — Jacob D Knutson
*Assistant Examiner* — Michael R Stabley
(74) *Attorney, Agent, or Firm* — Mori & Ward, LLP

(57) ABSTRACT

An actuation controller for a rider posture changing device of a human-powered vehicle comprises a detector and a controller. The rider posture changing device includes a first member, a second member, and an electrical actuator configured to move the second member relative to the first member. The detector is configured to detect actuation information relating to an actuation state in which the electrical actuator moves the second member relative to the first member. The controller is configured to evaluate the actuation state in accordance with the actuation information detected by the detector.

17 Claims, 13 Drawing Sheets

(56) References Cited

U.S. PATENT DOCUMENTS

| | | | | |
|---|---|---|---|---|
| 8,328,454 B2* | 12/2012 | McAndrews | ......... | B62K 19/18 |
| | | | | 403/109.7 |
| 8,550,551 B2* | 10/2013 | Shirai | ................ | B62K 19/36 |
| | | | | 297/215.13 |
| 8,641,073 B2* | 2/2014 | Lee | ..................... | B62K 19/36 |
| | | | | 280/288.4 |
| 8,744,699 B2* | 6/2014 | Yamaguchi | ........... | B62K 23/02 |
| | | | | 701/51 |
| 8,781,690 B2* | 7/2014 | Hara | .................... | B60N 2/02 |
| | | | | 701/49 |
| 8,911,012 B2* | 12/2014 | Choi | ....................... | B62J 1/08 |
| | | | | 297/215.15 |
| 8,926,216 B2* | 1/2015 | McAndrews | ......... | F16B 7/1409 |
| | | | | 403/109.7 |
| 9,415,824 B2* | 8/2016 | Maier | ................... | B62K 19/36 |
| 9,422,018 B2* | 8/2016 | Pelot | .................... | G05D 7/0635 |
| 9,944,337 B2* | 4/2018 | McAndrews | ............. | B62J 1/08 |
| 10,040,499 B2* | 8/2018 | Hara | ......................... | B62J 1/08 |
| 10,246,155 B2* | 4/2019 | McAndrews | ......... | B62K 19/36 |
| 10,450,022 B2* | 10/2019 | Watson | ................ | F15B 15/202 |
| 10,513,300 B2* | 12/2019 | Bowers | ...................... | B62J 1/08 |
| 10,556,634 B2* | 2/2020 | Komatsu | .................. | B62J 1/08 |
| 2011/0204201 A1* | 8/2011 | Kodama | ................... | B62J 1/08 |
| | | | | 248/406.1 |
| 2018/0186419 A1 | 7/2018 | Shipman et al. | | |

* cited by examiner

ACTUATION CONTROLLER AND ACTUATION SYSTEM

BACKGROUND OF THE INVENTION

Field of the Invention

The present invention relates to an actuation controller and an actuation system.

Discussion of the Background

A human-powered vehicle includes a control device configured to control a posture changing apparatus.

SUMMARY OF THE INVENTION

In accordance with a first aspect of the present invention, an actuation controller for a rider posture changing device of a human-powered vehicle comprises a detector and a controller. The rider posture changing device includes a first member, a second member, and an electrical actuator configured to move the second member relative to the first member. The detector is configured to detect actuation information relating to an actuation state in which the electrical actuator moves the second member relative to the first member. The controller is configured to evaluate the actuation state in accordance with the actuation information detected by the detector.

With the actuation controller according to the first aspect, it is possible to determine the actuation state of the rider posture changing device.

In accordance with a second aspect of the present invention, the actuation controller according to the first aspect is configured so that the detector is configured to detect electrical-load information of the electrical actuator as the actuation information.

With the actuation controller according to the second aspect, it is possible to determine the actuation state of the rider posture changing device using the electrical-load information of the electrical actuator.

In accordance with a third aspect of the present invention, the actuation controller according to the second aspect is configured so that the electrical-load information includes one of an electrical power, a voltage, a current, and a temperature of the electrical actuator.

With the actuation controller according to the third aspect, it is possible to reliably determine the actuation state of the rider posture changing device using the electrical-load information of the electrical actuator.

In accordance with a fourth aspect of the present invention, the actuation controller according to the third aspect is configured so that the controller is configured to evaluate the actuation state as an abnormal state if the electrical-load information is equal to or more than a threshold.

With the actuation controller according to the fourth aspect, it is possible to more reliably determine the actuation state of the rider posture changing device using the electrical-load information of the electrical actuator.

In accordance with a fifth aspect of the present invention, the actuation controller according to any one of the first to fourth aspects is configured so that the detector is configured to detect, as the actuation information, a first movement distance in which the second member is moved relative to the first member during a first predetermined period.

With the actuation controller according to the fifth aspect, it is possible to determine the actuation state of the rider posture changing device using the relative movement between the first member and the second member.

In accordance with a sixth aspect of the present invention, the actuation controller according to the fifth aspect is configured so that the controller is configured to evaluate the actuation state as an abnormal state if the first movement distance is out of a first predetermined range.

With the actuation controller according to the sixth aspect, it is possible to determine the abnormal state of the rider posture changing device using the relative movement between the first member and the second member.

In accordance with a seventh aspect of the present invention, the actuation controller according to the sixth aspect is configured so that the abnormal state includes a first abnormal state. The controller is configured to evaluate the actuation state as the first abnormal state if the first movement distance is out of the first predetermined range. The controller is configured to count a first count value. The controller is configured to increment the first count value if the controller evaluates the actuation state as the first abnormal state.

With the actuation controller according to the seventh aspect, it is possible to determine the first abnormal state of the rider posture changing device using the relative movement between the first member and the second member.

In accordance with an eighth aspect of the present invention, the actuation controller according to the seventh aspect is configured so that the abnormal state includes a second abnormal state. The controller is configured to evaluate whether the actuation state is the second abnormal state based on the first count value.

With the actuation controller according to the eighth aspect, it is possible to reliably determine the abnormal state of the rider posture changing device using the first count value.

In accordance with a ninth aspect of the present invention, the actuation controller according to the eighth aspect is configured so that the controller is configured to evaluate that the actuation state is the second abnormal state if the first count value is equal to or larger than a first count threshold.

With the actuation controller according to the ninth aspect, it is possible to more reliably determine the abnormal state of the rider posture changing device using the first count value.

In accordance with a tenth aspect of the present invention, the actuation controller according to the ninth aspect is configured so that the controller is configured to control the electrical actuator to move the second member relative to the first member during a second predetermined period if the controller concludes that the actuation state is the second abnormal state.

With the actuation controller according to the tenth aspect, it is possible to more reliably determine the abnormal state of the rider posture changing device.

In accordance with an eleventh aspect of the present invention, the actuation controller according to the tenth aspect is configured so that the controller is configured to control the electrical actuator to stop moving the second member relative to the first member if the second predetermined period elapses after the electrical actuator start to move the second member relative to the first member.

With the actuation controller according to the eleventh aspect, it is possible to more reliably determine the abnormal state of the rider posture changing device.

In accordance with a twelfth aspect of the present invention, the actuation controller according to the eleventh aspect is configured so that the controller is configured to increment a second count value if the second predetermined period elapses. The controller is configured to control the electrical actuator to move the second member relative to the first member until the second count value becomes equal to a second count threshold.

With the actuation controller according to the twelfth aspect, it is possible to more reliably determine the abnormal state of the rider posture changing device.

In accordance with a thirteenth aspect of the present invention, the actuation controller according to the eleventh or twelfth aspect is configured so that the detector is configured to detect, as the actuation information, a second movement distance in which the second member is moved relative to the first member during the second predetermined period. The controller is configured to evaluate the actuation state is still the second abnormal state if the second movement distance is out of a second predetermined range.

With the actuation controller according to the thirteenth aspect, it is possible to more reliably determine the abnormal state of the rider posture changing device.

In accordance with a fourteenth aspect of the present invention, the actuation controller according to the thirteenth aspect is configured so that the controller is configured to evaluate the actuation state is not the second abnormal state if the second movement distance is in the second predetermined range.

With the actuation controller according to the fourteenth aspect, it is possible to more reliably determine the abnormal state of the rider posture changing device.

In accordance with a fifteenth aspect of the present invention, the actuation controller according to the thirteenth or fourteenth aspect is configured so that the controller is configured to control the electrical actuator to arrange the second member relative to the first member at a predetermined position if the second movement distance is in the second predetermined range.

With the actuation controller according to the fifteenth aspect, it is possible to return the second member to the predetermined position in the normal state.

In accordance with a sixteenth aspect of the present invention, the actuation controller according to any one of the first to fifteenth aspects is configured so that the controller is provided to the rider posture changing device.

With the actuation controller according to the sixteenth aspect, it is possible to simplify the configuration of the controller and the rider posture changing device.

In accordance with a seventeenth aspect of the present invention, the actuation controller according to any one of the first to sixteenth aspects further comprises a wireless communicator.

With the actuation controller according to the seventeenth aspect, it is possible to omit an electric cable connecting the actuation controller to other electric components.

In accordance with an eighteenth aspect of the present invention, the actuation controller according to any one of the first to seventeenth aspects further comprises an informing device configured to inform a user of a determination result of the controller.

With the actuation controller according to the eighteenth aspect, it is possible to reliably inform the rider of the determination result of the controller.

In accordance with a nineteenth aspect of the present invention, the actuation controller according to any one of the first to eighteenth aspects is configured so that the first member includes a first tube. The second member includes a second tube. The electrical actuator is configured to move the second tube relative to the first tube.

With the actuation controller according to the nineteenth aspect, it is possible to apply the actuation controller to a telescopic apparatus.

In accordance with a twentieth aspect of the present invention, an actuation system for a human-powered vehicle comprises the actuation controller according to any one of the first to nineteenth aspects and the rider posture changing device.

With the actuation system according to the twentieth aspect, it is possible to provide the system configured to determine the abnormal state of the rider posture changing device using the actuation controller.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
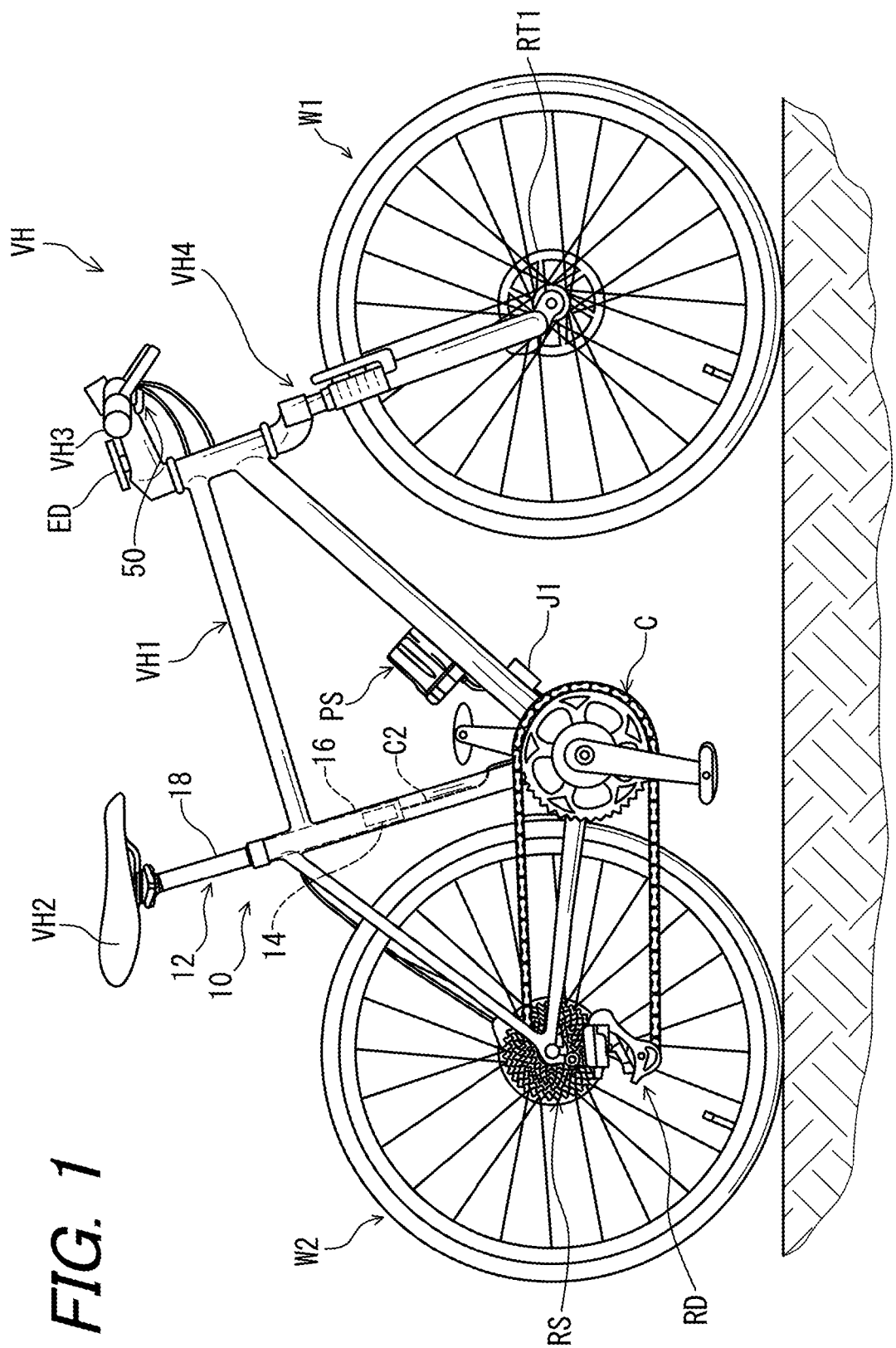
FIG. 1 is a side elevational view of a human-powered vehicle including an actuation system in accordance with a first embodiment.

The embodiment(s) will now be described with reference to the accompanying drawings, wherein like reference numerals designate corresponding or identical elements throughout the various drawings.

First Embodiment

Referring initially to FIG. 1, a human-powered vehicle VH includes an actuation system 10 in accordance with a first embodiment. For example, the human-powered vehicle VH is a vehicle to travel with a motive power including at least a human power of a user who rides the human-powered vehicle VH (i.e., rider). The human-powered vehicle VH has an arbitrary number of wheels. For example, the human-powered vehicle VH has at least one wheel. In this embodiment, the human-powered vehicle VH preferably has a smaller size than that of a four-wheeled automobile. However, the human-powered vehicle VH can have an arbitrary size. Examples of the human-powered vehicle VH include a bicycle, a tricycle, a recumbent bicycle, and a kick scooter. In this embodiment, the human-powered vehicle VH is a bicycle. An electric assisting system including an electric motor can be applied to the human-powered vehicle VH (e.g., the bicycle) to assist muscular motive power of the user. Namely, the human-powered vehicle VH can be an E-bike. While the human-powered vehicle VH is illustrated as a mountain bike, the actuation system 10 can be applied to road bikes or any type of human-powered vehicles.

The human-powered vehicle VH further includes a vehicle body VH1, a saddle VH2, a handlebar VH3, a front fork VH4, a front wheel W1, and a rear wheel W2. The actuation system 10 for the human-powered vehicle VH comprises a rider posture changing device 12. The rider posture changing device 12 is mounted to a tubular part of the vehicle body VH1. The saddle VH2 is attached to the rider posture changing device 12. The front fork VH4 is rotatably mounted to the vehicle body VH1. The handlebar VH3 is secured to the front fork VH4. The front wheel W1 is rotatably coupled to the front fork VH4. The rear wheel W2 is rotatably coupled to the vehicle body VH1.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on the saddle VH2 of the human-powered vehicle VH with facing the handlebar VH3. Accordingly, these term's, as utilized to describe the actuation system 10 or other components, should be interpreted relative to the human-powered vehicle VH equipped with the actuation system 10 as used in an upright riding position on a horizontal surface.

The human-powered vehicle VH includes a chain C, a rear derailleur RD, a rear sprocket assembly RS, and a power supply PS. The rear derailleur RD is mounted to the vehicle body VH1 and is configured to shift the chain C relative to the rear sprocket assembly RS to change a gear position. Since the rear derailleur RD includes structures which are known in the vehicle field, they will not be described in detail here for the sake of brevity.

Figure 2:
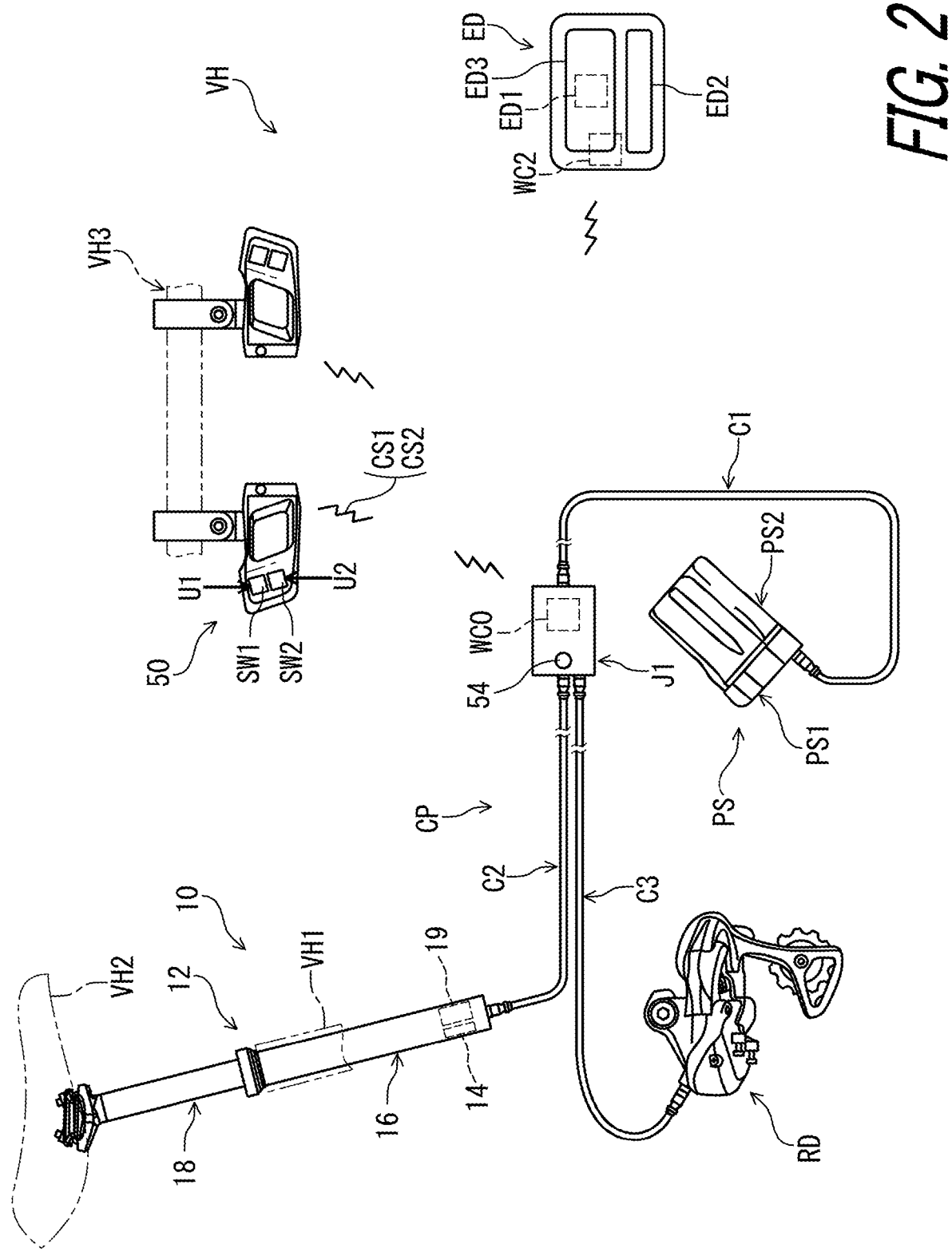
FIG. 2 is a schematic diagram of the actuation system of the human-powered vehicle illustrated in FIG. 1.

As seen in FIG. 2, the power supply PS includes a battery holder PS1 and a battery PS2. The battery holder PS1 is mounted to the vehicle body VH1 (FIG. 1) and is configured to detachably receive the battery PS2. The battery PS2 is electrically connected to the battery holder PS1 in a state where the battery PS2 is mounted to the battery holder PS1. Examples of the battery PS2 include a primary battery (e.g., a dry-cell battery) and a secondary battery (e.g., a rechargeable battery such as a rechargeable lithium-ion battery).

The actuation system 10 for the human-powered vehicle VH comprises an actuation controller 14. The actuation controller 14 is configured to control the rider posture changing device 12. In this embodiment, the rider posture changing device 12 includes a height adjustable seatpost. However, the rider posture changing device 12 can include other apparatuses such as a suspension instead of or in addition to the height adjustable seatpost.

As seen in FIG. 2, the human-powered vehicle VH includes an electric communication path CP. The power supply PS is electrically connected to the rear derailleur RD and the actuation system 10 with the electric communication path CP to supply electric power to the rear derailleur RD and the actuation system 10.

The electric communication path CP includes a junction J1 and electric cables C1 to C3. Each of the electric cables C1 to C3 includes electric connectors at both ends thereof. The junction J1 is electrically connected to the battery holder PS1 with the electric cable C1. The junction J1 is electrically connected to the actuation system 10 with the electric cable C2. The junction J1 is electrically connected to the rear derailleur RD with the electric cable C3.

Figure 3:
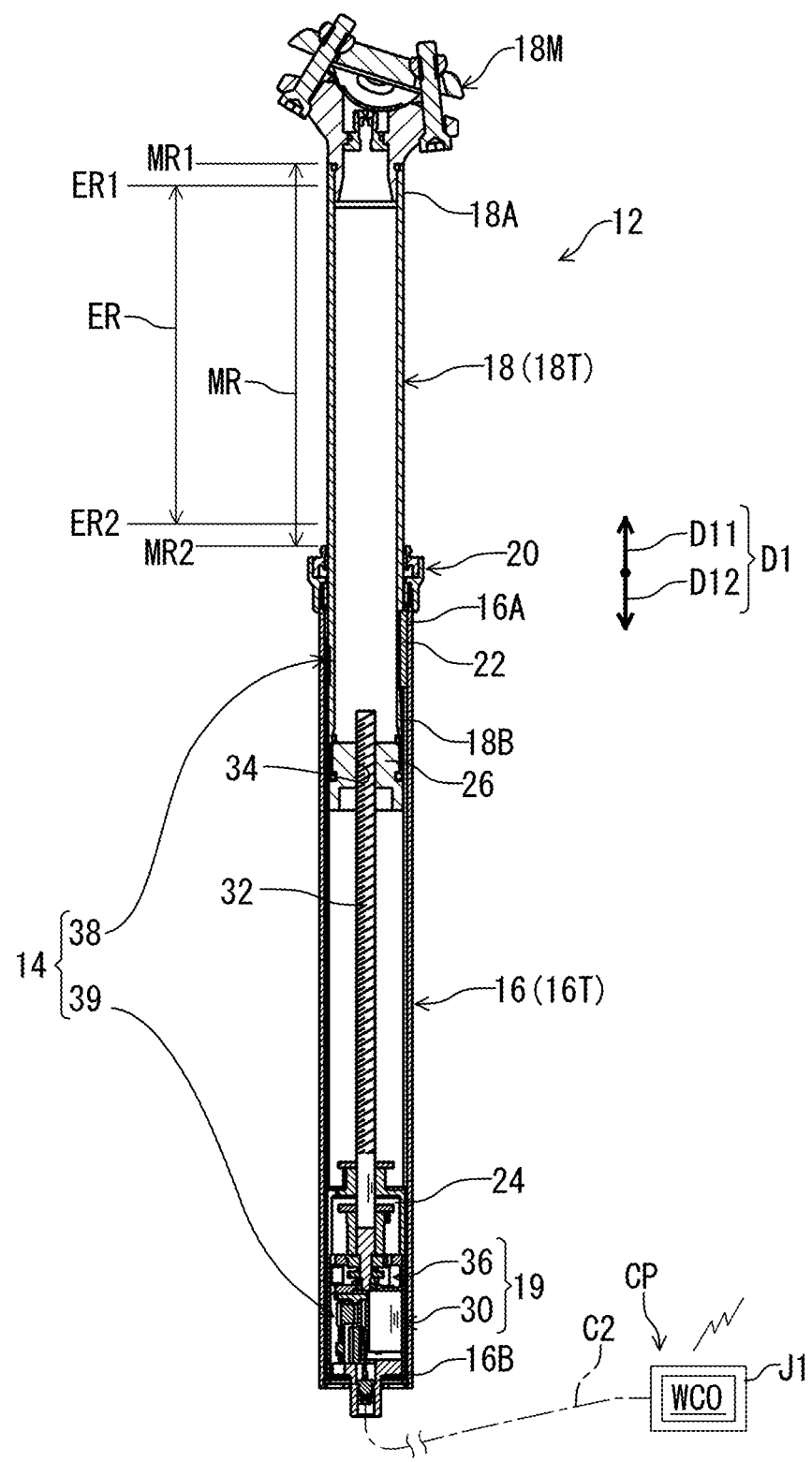
FIG. 3 is a cross-sectional view of a rider posture changing device of the actuation system illustrated in FIG. 2.

As seen in FIG. 3, the rider posture changing device 12 includes a first member 16, a second member 18, and an electrical actuator 19 configured to move the second member 18 relative to the first member 16. In this embodiment, the first member 16 includes a first tube 16T. The second member 18 includes a second tube 18T. The electrical actuator 19 is configured to move the second tube 18T relative to the first tube 16T. The second member 18 is configured to be telescopically coupled to the first member 16. The second member 18 is movable relative to the first member 16 in a telescopic direction D1. The first member 16 and the second member 18 extend in the telescopic direction D1. The second member 18 is telescopically received in the first member 16. However, the structure of the rider posture changing device 12 is not limited to this embodiment.

The first member 16 includes a first end 16A and a first opposite end 16B. The first member 16 extends between the first end 16A and the first opposite end 16B. The second member 18 includes a second end 18A and a second opposite end 18B. The second member 18 extends between the second end 18A and the second opposite end 18B. The electrical actuator 19 is attached to the first opposite end 16B of the first member 16. A saddle mounting part 18M is attached to the second end 18A of the second member 18.

The rider posture changing device 12 has a mechanical movable range MR. For example, the mechanical movable range MR is defined based on the second end 18A of the second member 18. The mechanical movable range MR is a range in which the second member 18 is mechanically movable relative to the first member 16 in the telescopic direction D1. The mechanical movable range MR includes a first mechanical limit MR1 and a second mechanical limit MR2. The mechanical movable range MR is defined between the first mechanical limit MR1 and the second mechanical limit MR2 in the telescopic direction D1.

The rider posture changing device 12 has an electrical movable range ER. The electrical movable range ER is a range in which the second member 18 is movable relative to the first member 16 in the telescopic direction D1. The electrical movable range ER includes a first electrical limit ER1 and a second electrical limit ER2. The electrical movable range ER is defined between the first electrical limit ER1 and the second electrical limit ER2 in the telescopic direction D1. The actuation controller 14 is configured to control the rider posture changing device 12 in the electrical movable range ER. In this embodiment, the electrical movable range ER is smaller than the mechanical movable range MR. However, the first electrical limit ER1 can be coincident with the first mechanical limit MR1. The second electrical limit ER2 can be coincident with the second mechanical limit MR2.

The rider posture changing device 12 includes a first stopper 20, a first receiving member 22, a second stopper 24, and a second receiving member 26. The first stopper 20 is secured to the first end 16A of the first member 16. The first receiving member 22 is attached to the second member 18. The second stopper 24 is secured to the first opposite end 16B of the first member 16. The second receiving member 26 is attached to the second opposite end 18B of the second member 18.

The first stopper 20 is in contact with the first receiving member 22 in a state where the second member 18 is at the first mechanical limit ML1. The second stopper 24 is in contact with the second receiving member 26 in a state where the second member 18 is at the second mechanical limit ML2. The first stopper 20 and the first receiving member 22 define the first mechanical limit ML1. The second stopper 24 and the second receiving member 26 define the second mechanical limit ML2.

The electrical actuator 19 is configured to telescopically displace the first member 16 relative to the second member 18. The electrical actuator 19 is provided to peripheral of at least one of the first member 16 and the second member 18. In this embodiment, the electrical actuator 19 is provided to the first member 16. However, the electrical actuator 19 can be provided to the second member 18 or both the first member 16 and the second member 18.

The electrical actuator 19 includes at least one of a hydraulic device, a pneumatic device, an electric motor, a solenoid, a shape memory alloy, and a piezoelectric element. In this embodiment, the electrical actuator 19 includes an electric motor 30 configured to displace the second member 18 relative to the first member 16. However, the electrical actuator 19 can include at least one of the hydraulic device, the pneumatic device, the solenoid, the shape memory alloy, and the piezoelectric element instead of or in addition to the electric motor 30.

In this embodiment, the rider posture changing device 12 includes a screw rod 32 having an external thread. The second receiving member 26 includes a threaded hole 34. The screw rod 32 is operatively coupled to the electrical actuator 19.

Figure 4:
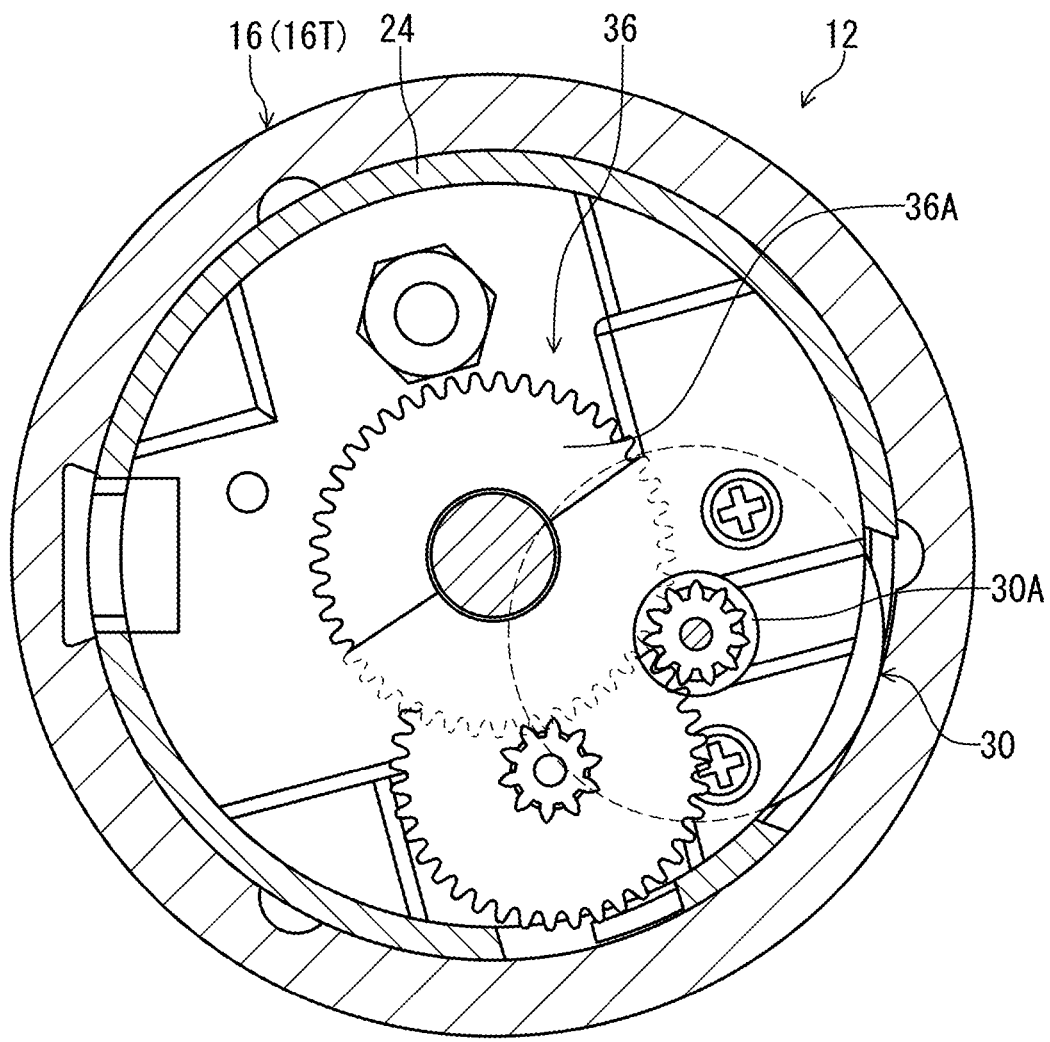
FIG. 4 is a cross-sectional view of the rider posture changing device of the actuation system illustrated in FIG. 2.
Figure 5:
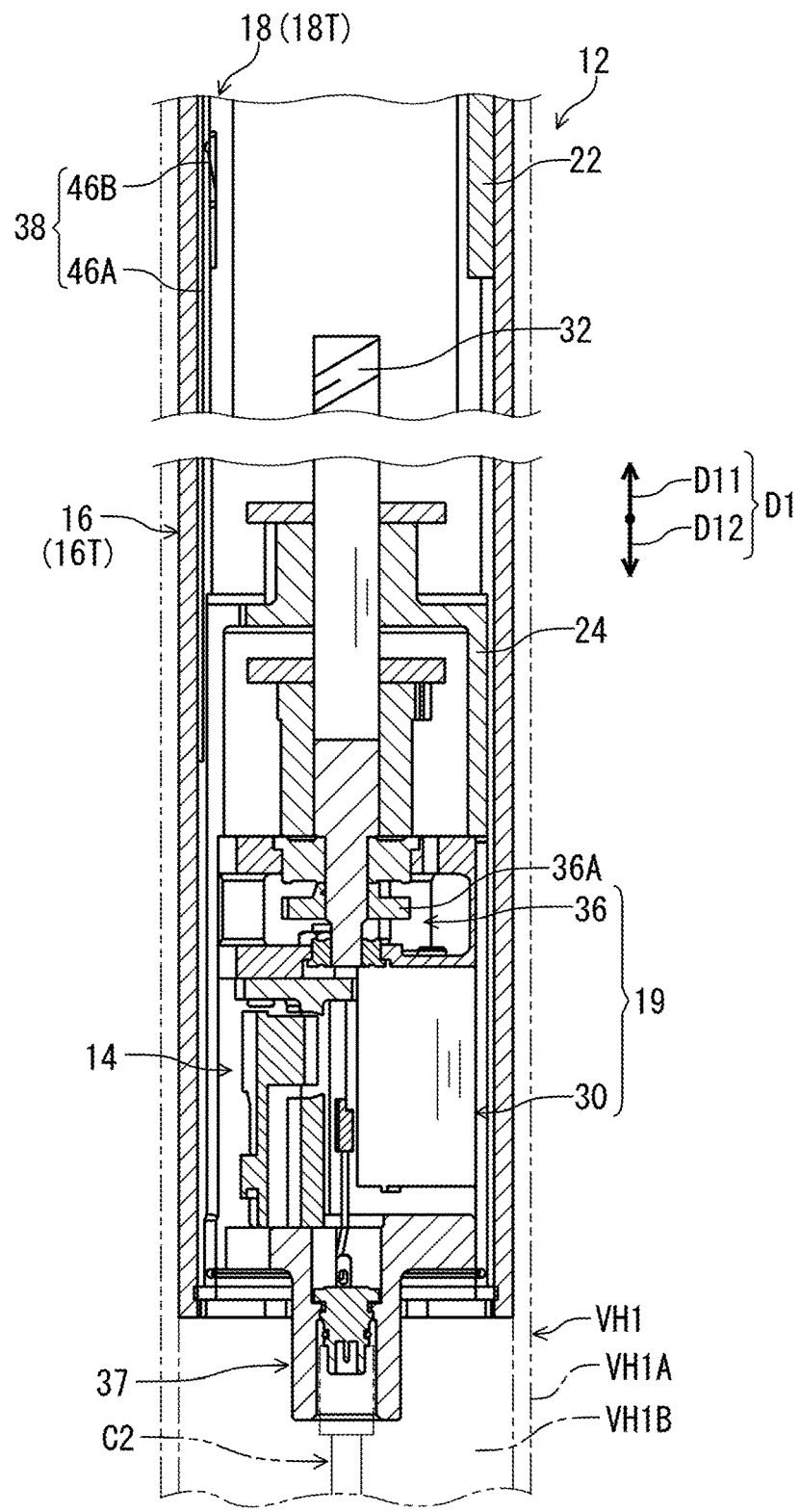
FIG. 5 is a partial enlarged cross-sectional view of the rider posture changing device of the actuation system illustrated in FIG. 2.

As seen in FIG. 4, in this embodiment, the electrical actuator 19 includes a gear reducer 36 coupled to a driving shaft 30A of the electric motor 30 to reduce a rotation of the driving shaft 30A. As seen in FIG. 5, the screw rod 32 is coupled to an output gear 36A of the gear reducer 36. The screw rod 32 is threadedly engaged in the threaded hole 34 of the second receiving member 26. The electrical actuator 19 is configured to rotate the screw rod 32 to move the second member 18 relative to the first member 16 in the telescopic direction D1.

As seen in FIG. 3, the electrical actuator 19 is configured to rotate the screw rod 32 in a first rotational direction to move the second member 18 relative to the first member 16 in a first telescopic direction D11 defined along the telescopic direction D1. The electrical actuator 19 is configured to rotate the screw rod 32 in a second rotational direction to move the second member 18 relative to the first member 16 in a second telescopic direction D12 defined along the telescopic direction D1. The second telescopic direction D12 is an opposite direction of the first telescopic direction D11.

As seen in FIG. 5, the rider posture changing device 12 comprises an electric cable connector 37. The electric cable connector 37 is provided to one of the first member 16 and the second member 18. In this embodiment, the electric cable connector 37 is provided to the first member 16. However, the electric cable connector 37 can be provided to the second member 18. The electric cable connector 37 is configured to be detachably coupled to the electric cable C2.

The first member 16 is configured to be mounted to the vehicle body VH1 of the human-powered vehicle VH. The electric cable connector 37 is provided to the first member 16 such that the electric cable C2 is routed at least partially within an internal space of the vehicle body VH1 of the human-powered vehicle VH. The vehicle body VH1 includes a seat tube VH1A having an internal space VH1B. The first member 16 is provided in the internal space VH1B of the seat tube VH1A in a state where the rider posture changing device 12 is mounted to the vehicle body VH1. The electric cable C2 is routed at least partially within the internal space VH1B of the seat tube VH1A.

Figure 6:
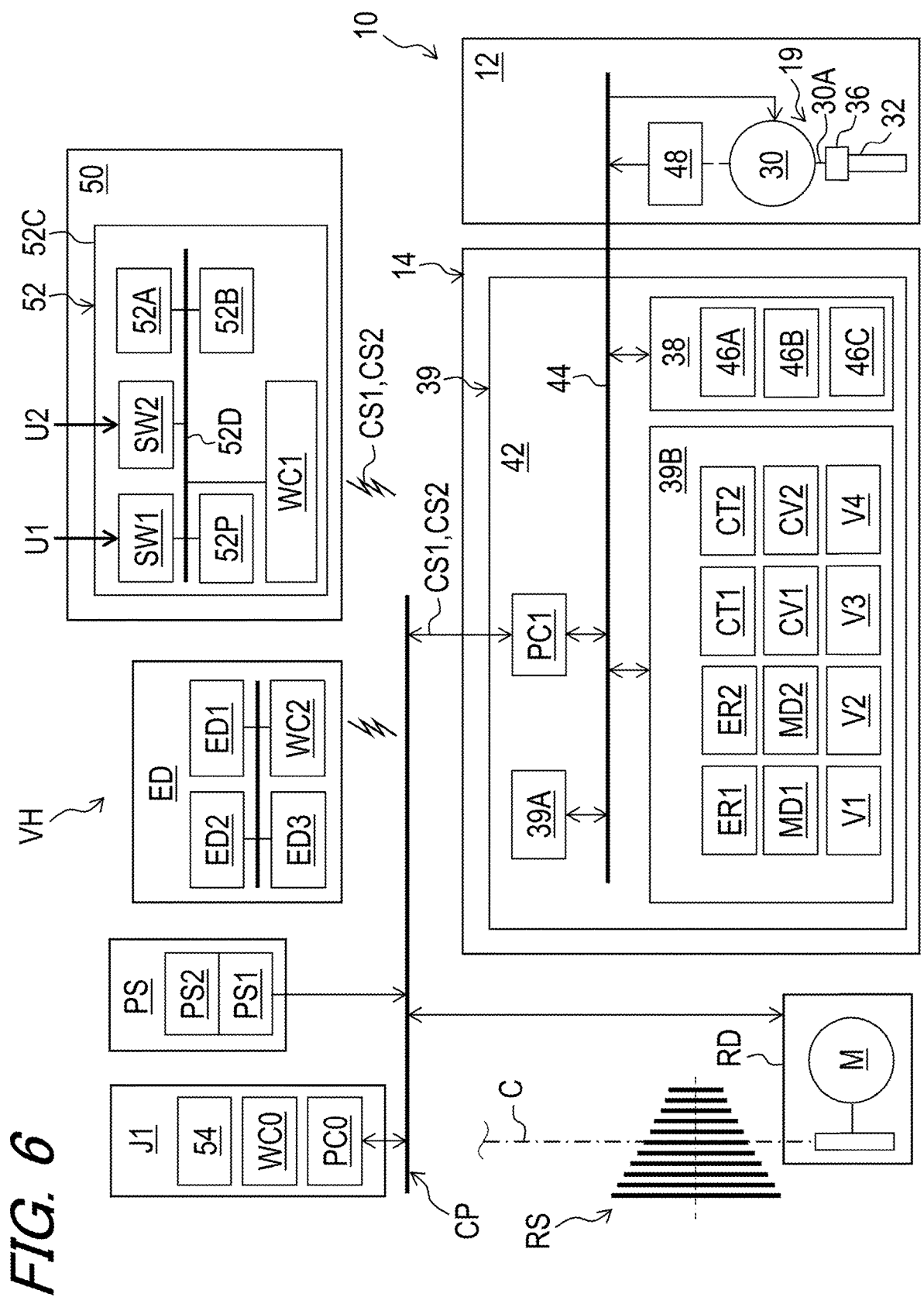
FIG. 6 is a block diagram of the actuation system illustrated in FIG. 2.

As seen in FIG. 6, the actuation controller 14 for the rider posture changing device 12 of the human-powered vehicle VH comprises a detector 38 and a controller 39. In this embodiment, the controller 39 is provided to the rider posture changing device 12. The detector 38 is provided to the rider posture changing device 12. However, the controller 39 and the detector 38 can be provided to other devices.

The controller 39 is configured to control the electrical actuator 19. The controller 39 includes a processor 39A and a memory 39B. The processor 39A includes a central processing unit (CPU) and a memory controller. The memory 39B includes a read only memory (ROM) and a random-access memory (RAM). The ROM includes a non-transitory computer-readable storage medium. The RAM includes a transitory computer-readable storage medium. The memory 39B includes storage areas each having an address in the ROM and the RAM. The processor 39A controls the memory 39B to store data in the storage areas of the memory 39B and reads data from the storage areas of the memory 39B. The controller 39 includes a circuit board 42 and a bus 44. The processor 39A and the memory 39B are electrically mounted on the circuit board 42. The processor 39A is electrically connected to the memory 39B through the circuit board 42.

The circuit board 42 and the electrical actuator 19 are electrically connected to the bus 44. The electrical actuator 19 is electrically connected to the processor 39A and the memory 39B with the bus 44 and the circuit board 40. The memory 39B (e.g., the ROM) stores a program. The program is read into the controller 39, and thereby the configuration and/or algorithm of the actuation controller 14 is performed.

The detector 38 is configured to detect actuation information relating to an actuation state in which the electrical actuator 19 moves the second member 18 relative to the first member 16. The controller 39 is configured to evaluate the actuation state in accordance with the actuation information detected by the detector 38. For example, the actuation information includes information relating to a movement of the second member 18 relative to the first member 16 and information relating to the electrical actuator 19. In this embodiment, the actuation information includes the information relating to the movement of the second member 18 relative to the first member 16.

The detector 38 is configured to detect a current position of a reference portion of the rider posture changing device 12. The detector 38 is electrically connected to the processor 39A and the memory 39B through the circuit board 42. In this embodiment, the reference portion of the rider posture changing device 12 is defined as the second end 18A (see e.g., FIG. 3) of the second member 18. The second end 18A can also be referred to as the reference portion 18A. However, the reference portion can be defined as other portions of the rider posture changing device 12.

As seen in FIG. 3, the detector 38 is configured to detect a current position of the second member 18 relative to the first member 16. The detector 38 is configured to periodically detect a current position of the second member 18 relative to the first member 16. Examples of the detector 38 include a contact position sensor and a non-contact position sensor. Examples of the contact position sensor include a resistance position sensor and an encoder. Examples of the non-contact position sensor include a magnetic position sensor, a laser sensor, an ultrasonic wave sensor, and an optical sensor. In this embodiment, the position sensor includes a resistance position sensor. However, the detector 38 is not limited to this embodiment.

As seen in FIG. 5, the detector 38 includes a resistivity substrate 46A and a brush 46B. The resistivity substrate 46A is attached to an inner peripheral surface 16C of the first member 16 and extends along the first member 16 in the telescopic direction D1. The brush 46B is attached to an outer peripheral surface 18C of the second member 18 to be in contact with the resistivity substrate 46A. The brush 46B is in slidable contact with the resistivity substrate 46A.

As seen in FIG. 6, the detector 38 includes a resistance sensor 46C. The resistance sensor 46C is electrically connected to the resistivity substrate 46A. The resistance sensor 46C is electrically mounted on the circuit board 42. The resistance sensor 46C is electrically connected to the processor 39A and the memory 39B through the circuit board 42. The resistance sensor 46C is configured to sense a resistance value of the resistivity substrate 46A. The resistance value sensed by the resistance sensor 46C indicates a position of the second member 18 relative to the first member 16. Thus, the detector 38 is configured to detect a current position of the second member 18 relative to the first member 16. The controller 39 is configured to store the position sensed by the detector 38 in the memory 39B. The controller 39 is configured to update the position stored in the memory 39B with the latest position sensed by the detector 38.

The actuation controller 14 includes an actuator driver 48. The actuator driver 48 is electrically connected to the processor 39A and the memory 39B. The actuator driver 48 is configured to control the electrical actuator 19 (e.g., the electric motor 30) to rotate the screw rod 32 based on a control command generated by the controller 39. The control command includes a start of rotation of the driving shaft 30A, a rotational direction of the driving shaft 30A of the electric motor 30, and a stop of rotation of the driving shaft 30A.

As seen in FIG. 2, the actuation system 10 comprises an operating device 50. The actuation controller 14 is configured to control the rider posture changing device 12 in response to control signals transmitted from the operating device 50. In this embodiment, the operating device 50 includes a first electrical switch SW1 and a second electrical switch SW2.

The first electrical switch SW1 is configured to be activated in response to a first user input U1. For example, the first electrical switch SW1 includes a push-button switch. The second electrical switch SW2 is configured to be activated in response to a second user input U2. For example, the second electrical switch SW2 includes a push-button switch.

As seen in FIG. 6, the operating device 50 includes a signal controller 52. The signal controller 52 is configured to generate a first control signal CS1 in response to the first user input U1. The signal controller 52 is configured to generate a second control signal CS2 in response to the second user input U2. For example, the signal controller 52 is configured to generate the first control signal CS1 having a signal length corresponding to an operation time of the first user input U1 in response to the first user input U1. The signal controller 52 is configured to generate the second control signal CS2 having a signal length corresponding to an operation time of the second user input U2 in response to the second user input U2. However, the configuration of the signal controller 52 is not limited to this embodiment.

The signal controller 52 includes a processor 52A, a memory 52B, and a circuit board 52C. The processor 52A and the memory 52B are electrically mounted on the circuit board 52C. The processor 52A includes a central processing unit (CPU) and a memory controller. The memory 52B is electrically connected to the processor 52A. The memory 52B includes a ROM and a RAM. The memory 52B includes storage areas each having an address in the ROM and the RAM. The processor 52A controls the memory 52B to store data in the storage areas of the memory 52B and reads data from the storage areas of the memory 52B. The circuit board 52C and the first electrical switch SW1 are electrically connected to a bus 52D. The first electrical switch SW1 is electrically connected to the processor 52A and the memory 52B with the bus 52D and the circuit board 52C. The memory 52B (e.g., the ROM) stores a program. The program is read into the processor 52A, and thereby the configuration and/or algorithm of the signal controller 52 is performed.

The human-powered vehicle VH includes an external device ED. The controller 39 is configured to communicate with the operating device 50. The controller 39 is configured to communicate with the external device ED. In this embodiment, the actuation controller 14 further comprises a wireless communicator WC0. The wireless communicator WC0 is electrically connected to the controller 39. The wireless communicator WC0 is configured to be wirelessly in communication with the external device ED. The controller 39 is electrically connected to the wireless communicator WC0 to receive, through the wireless communicator, control signals wirelessly transmitted from the wireless communicator of the operating device 50.

The operating device 50 includes a wireless communicator WC1 and a power source 52P. The wireless communicator WC1 is configured to be wirelessly in communication with the wireless communicator WC0 of the actuation controller 14. The power source 52P is connected to the signal controller 52 and the wireless communicator WC1 to supply electric power to the signal controller 52 and the wireless communicator WC1.

The wireless communicator WC1 is connected to the signal controller 52 to wirelessly transmit each of the first control signal CS1 and the second control signal CS2 to the actuation controller 14 through the wireless communicator WC0. The wireless communicator WC1 includes a signal transmitting circuit, a signal receiving circuit, and an antenna. Thus, the wireless communicator WC1 can also be referred to as a wireless communication circuit WC1. The wireless communicator WC1 is configured to superimpose digital signals such as the first control signal CS1 and the second control signal CS2 on carrier wave using a predetermined wireless communication protocol to wirelessly transmit the first control signal CS1 and the second control signal CS2.

The wireless communicator WC0 is configured to wirelessly receive each of the first control signal CS1 and the second control signal CS2 to the actuation controller 14 through the wireless communicator WC0. The wireless communicator WC0 includes a signal transmitting circuit, a signal receiving circuit, and an antenna. Thus, the wireless communicator WC0 can also be referred to as a wireless communication circuit WC0. The wireless communicator WC0 is configured to superimpose digital signals such as the first control signal CS1 and the second control signal CS2 on carrier wave using a predetermined wireless communication protocol to wirelessly transmit the first control signal CS1 and the second control signal CS2.

As seen in FIG. 2, in this embodiment, the wireless communicator WC0 is provided in the junction J1 and is connected to the rider posture changing device 12 and the rear derailleur RD with the electric communication path CP. The wireless communicator WC0 can be provided at other locations such as the rider posture changing device 12, the rear derailleur RD, and the battery holder PS1.

The controller 39 is configured to communicate with the wireless communicator WC0 using power line communication technology. Each of the electric cables C1 to C3 includes a ground line and a voltage line that are detachably connected to a serial bus that is formed by communication interfaces and the junction J1. Electricity is supplied from the battery PS2 to the actuation system 10 and the rear derailleur RD via the voltage line. In this embodiment, the controller 39, the wireless communicator WC0, and the rear derailleur RD can all communicate with each other through the voltage line using the power line communication technology.

Power line communication (PLC) carries data on a conductor that is also used simultaneously for electric power transmission or electric power distribution to electric components. In this embodiment, the electric power is supplied from the battery PS2 to the controller 39, the wireless communicator WC0, and the rear derailleur RD via the battery holder PS1 and the electric communication path CP. Furthermore, the controller 39, the wireless communicator WC0, and the rear derailleur RD send and receive control signals via the electric communication path CP using the PLC.

The PLC uses unique identifying information such as a unique identifier that is assigned to each of the controller 39, the wireless communicator WC0, and the rear derailleur RD. Each of the controller 39, the wireless communicator WC0, and the rear derailleur RD includes a PLC controller in which the unique identifying information is stored. Based on the unique identifying information, each of the controller 39, the wireless communicator WC0, and the rear derailleur RD can recognize control signals which are necessary for itself among control signals transmitted via the electric communication path CP.

The controller 39 of the actuation controller 14 is configured to communicate with the operating device 50 using the wireless communication and the PLC. However, the controller 39 of the actuation controller 14 can be configured to communicate with the operating device 50 using one of the wireless communication and the PLC or other communication technology.

The actuation system 10 includes a PLC controller PC0 connected to the wireless communicator WC0. The PLC controller PC0 is connected to the electric communication path CP. The PLC controller PC is configured to separate input signals to a power source voltage and control signals. The PLC controller PC is configured to regulate the power source voltage to a level at which the wireless communicator WC0 can properly operate. The PLC controller PC is further configured to superimpose output signals such as the first control signal CS1 and the second control signal VS2 on the power source voltage applied to the electric communication path CP from the power supply PS.

The actuation controller 14 includes a PLC controller PC1. The PLC controller PC1 is connected to the wireless communicator WC1 with the electric communication path CP and the PLC controller PC0. The first PLC controller PC1 is connected to the processor 39A and the memory 39B with the bus 44.

The actuation controller 14 further comprises an informing device 54 configured to inform a user of a determination result of the controller 39. The informing device 54 is electrically connected to the controller 39. In this embodiment, the informing device 54 includes an indicator 54A configured to indicate the determination result of the controller 39. The indicator 54A includes a light emitting device configured to emit light. However, the structure of the informing device 54 is not limited to this embodiment. The informing device 54 can include an electric component such as a cycle computer, a smart phone, a tablet computer, and a display device. Thus, the external device ED can be the informing device 54. The informing device 54 can be configured to inform the user to the determination result of the controller 39 with light, vibration, sound or other methods.

The controller 39 is configured to control the electrical actuator 19 to move the second member 18 relative to the first member 16 in response to one of the first control signal CS1 and the second control signal CS2. The controller 39 is configured to control the electrical actuator 19 to move the second member 18 relative to the first member 16 in the first telescopic direction D11 (see e.g., FIG. 3) while the controller 39 receives the first control signal CS1. The controller 39 is configured to control the electrical actuator 19 to stop moving the second member 18 relative to the first member 16 in response to termination of the first control signal CS1. The controller 39 is configured to control the electrical actuator 19 to move the second member 18 relative to the first member 16 in the second telescopic direction D12 (see e.g., FIG. 3) while the controller 39 receives the second control signal CS2. The controller 39 is configured to control the electrical actuator 19 to stop moving the second member 18 relative to the first member 16 in response to termination of the second control signal CS2.

Figure 7:
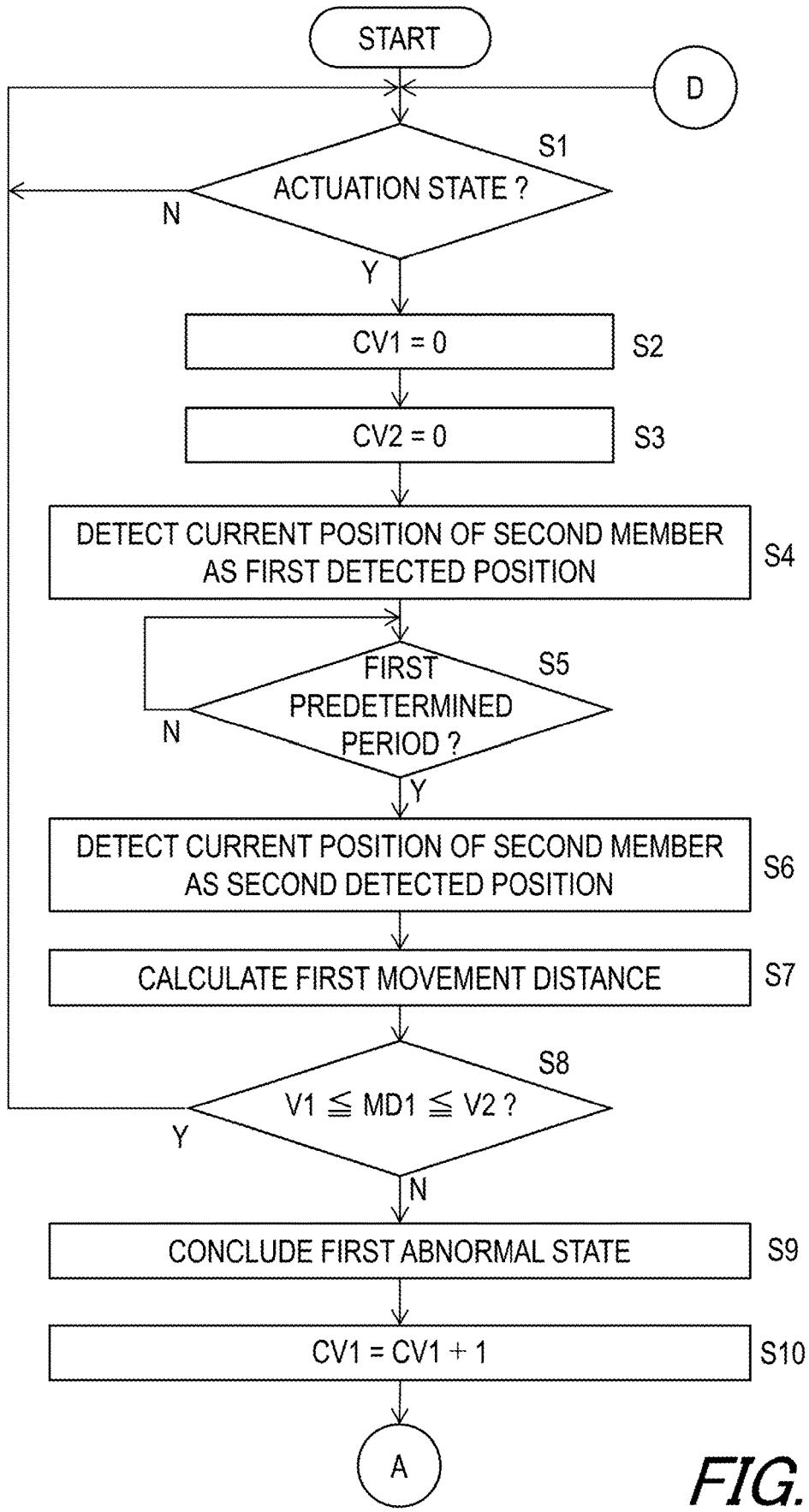
FIGS. 7 to 9 are flow charts of the actuation system illustrated in FIG. 6.
Figure 8:
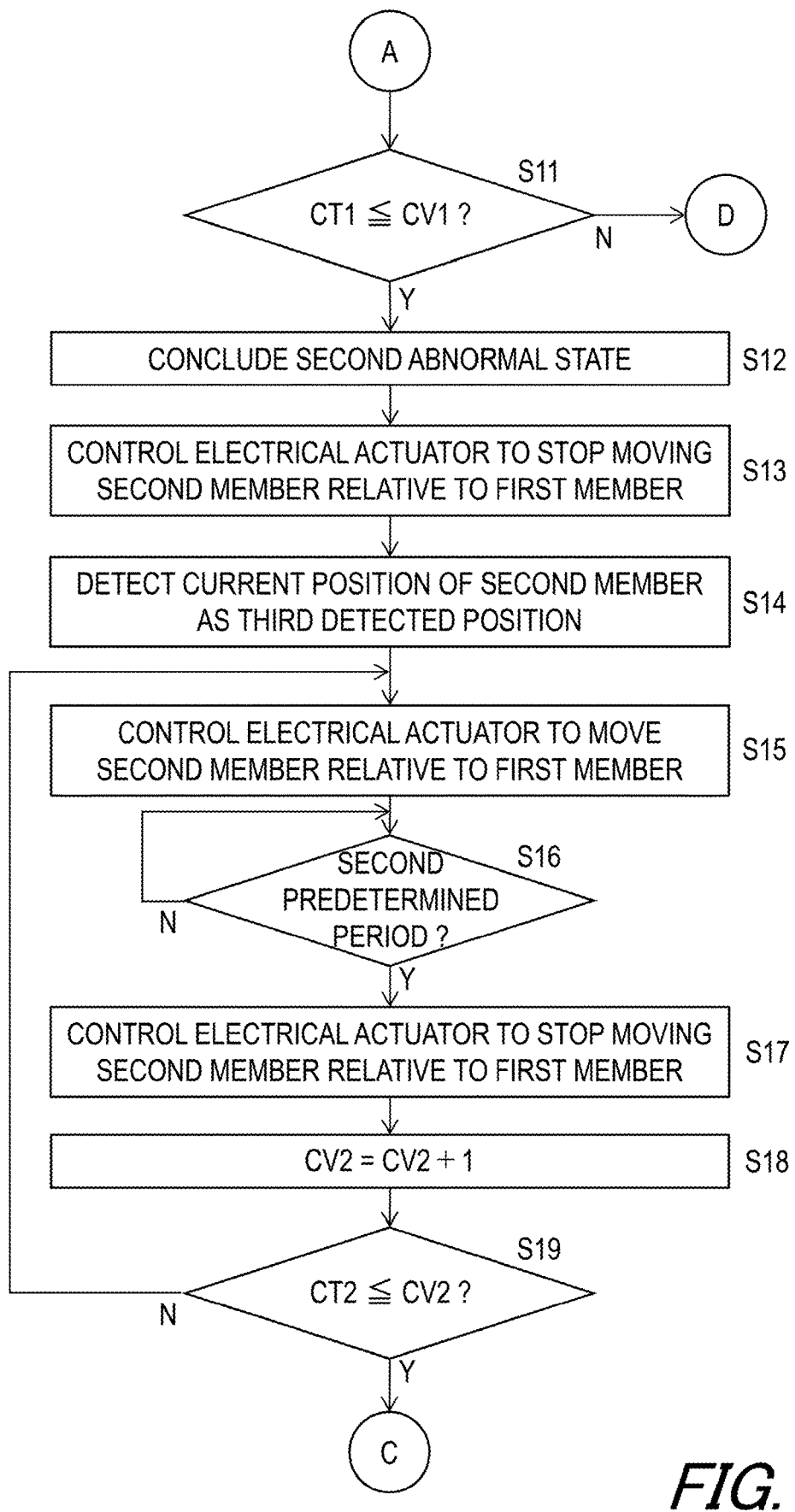
Figure 9:
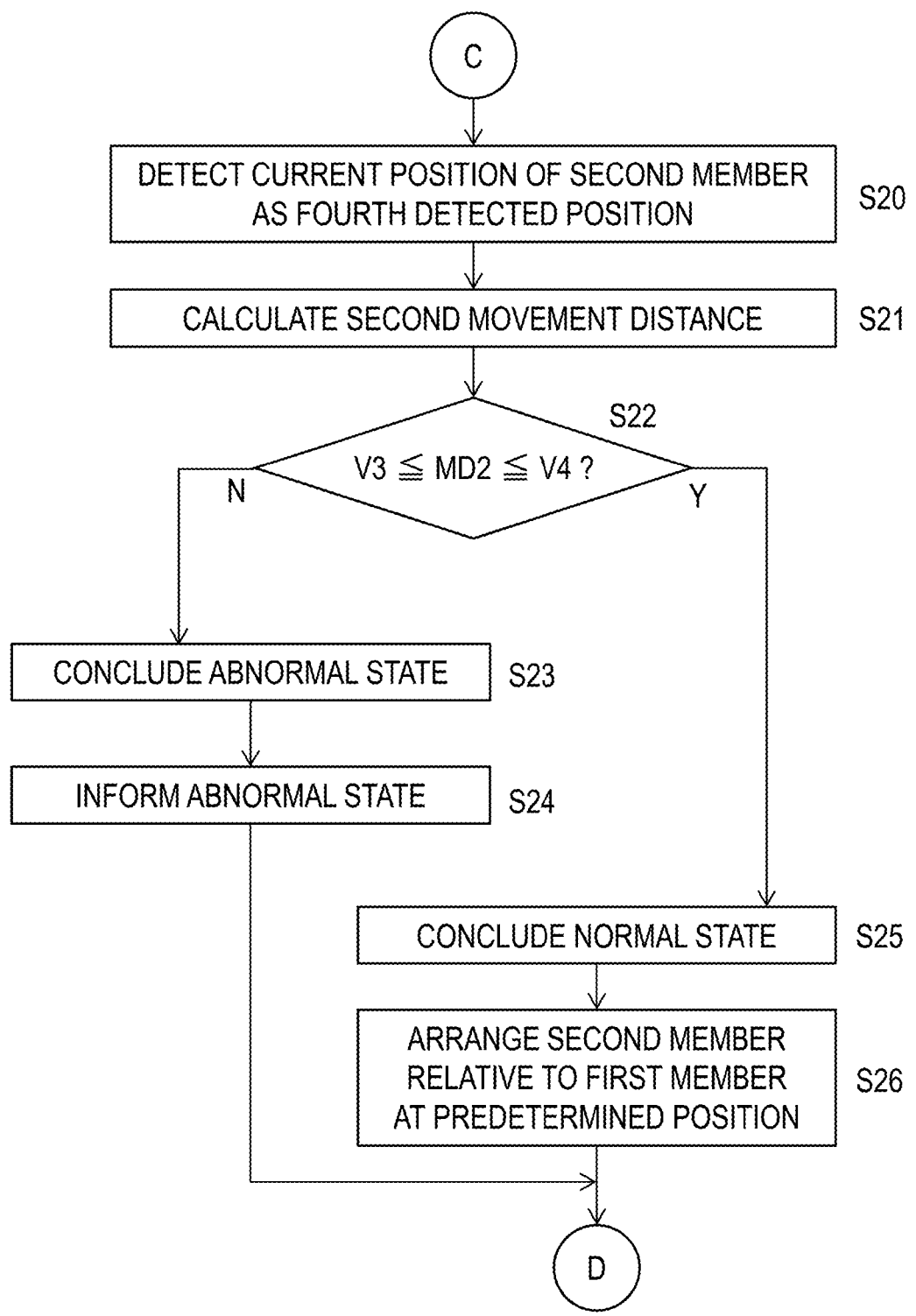

As seen in FIGS. 7 to 9, the actuation system 10 is configured to check the actuation state of the rider posture changing device 12.

As seen in FIG. 7, the controller 39 is configured to determine whether the rider posture changing device 12 is in the actuation state (Step S1). In this embodiment, the detector 38 is configured to detect the actuation state (Step S1). The controller 39 is configured to reset a first count value CV1 and a second count value CV2 if the rider posture changing device 12 is in the actuation state (Steps S2 and S3).

In the actuation state, the detector 38 is configured to detect, as the actuation information, a first movement distance MD1 in which the second member 18 is moved relative to the first member 16 during a first predetermined period. In this embodiment, the detector 38 is configured to detect a current position of the second member 18 relative to the first member 16 as a first detected position if the controller 39 concludes that the rider posture changing device 12 is in the actuation state (Step S4).

The detector 38 is configured to detect a current position of the second member 18 relative to the first member 16 as a second detected position if the first predetermined period elapses after detection of the first detected position (Steps S5 and S6). The detector 38 is configured to calculate a different between the first detected position and the second detected position as the first movement distance MD1 (Step S7). The controller 39 is configured to store the calculated difference as the first movement distance MD1 in the memory 39B. The controller 39 can be configured to calculate the different between the first detected position and the second detected position as the first movement distance MD1.

The controller 39 is configured to evaluate the actuation state as an abnormal state if the first movement distance MD1 is out of a first predetermined range (Steps S8 and S9). In this embodiment, the abnormal state includes a first abnormal state. The controller 39 is configured to evaluate the actuation state as the first abnormal state if the first movement distance MD1 is out of the first predetermined range (Steps S8 and S9). Namely, the first abnormal state includes a state in which the second member 18 is not normally moved relative to the first member 16 due to malfunctioning, error or the likes.

The controller 39 is configured to store the first predetermined period and the first predetermined range. For example, the first predetermined period is 1 sec, and the normal speed of the second member 18 is approximately 10 mm/sec. The first predetermined range includes a minimum value V1 and a maximum value V2. The first predetermined range is defined from the minimum value V1 to the maximum value V2. Since the normal speed is approximately 10 mm/sec, for example, the maximum value is 12 mm, and the minimum value is 8 mm. However, the first predetermined period and the first predetermined range are not limited to this embodiment and the above values.

The controller 39 is configured to evaluate the actuation state as the first abnormal state if the first movement distance MD1 is smaller than the minimum value V1 or larger than the maximum value V2 (Steps S8 and S9). The actuation state includes a normal state different from the abnormal state. The controller 39 is configured to evaluate the actuation state as the normal state if the first movement distance MD1 is in the first predetermined range. More specifically, the controller 39 is configured to evaluate the actuation state as the normal state if the first movement distance MD1 is in the first predetermined range defined between the minimum value V1 and the maximum value V2 (Step S8). Namely, the normal state includes a state in which the second member 18 is normally moved relative to the first member 16. The process returns to Step S3 if the actuation state is the normal state.

The controller 39 is configured to count the first count value CV1 (Step S10). In this embodiment, the controller 39 is configured to increment the first count value CV1 if the controller 39 evaluates the actuation state as the first abnormal state (Steps S8 to S10). The controller 39 is configured not to increment the first count value CV1 as the controller 39 evaluates the actuation state as the normal state (Step S8). The controller 39 is configured to store the first count value CV1 in the memory 39B. The controller 39 is configured to replace the first count value CV1 stored in the memory 39B with the first count value CV1 incremented by the controller 39 if the controller 39 increments the first count value CV1.

As seen in FIG. 8, the abnormal state includes a second abnormal state. The controller 39 is configured to evaluate whether the actuation state is the second abnormal state based on the first count value CV1 (Step S11). In this embodiment, the controller 39 is configured to evaluate that the actuation state is the second abnormal state if the first count value CV1 is equal to or larger than a first count threshold CT1 (Steps S11 and S12). The controller 39 is configured to control the electrical actuator 19 to stop moving the second member 18 relative to the first member 16 if the controller 39 concludes that the actuation state is the second abnormal state (Steps S11 and S13). On the other hand, the controller 39 is configured to evaluate that the actuation state is not the second abnormal state if the first count value CV1 is smaller than the first count threshold CT1 (Step S11). The process returns to Step S3 if the actuation state is not the second abnormal state. The controller 39 is configured to store the first count threshold CT1 in the memory 39B.

The detector 38 is configured to detect, as the actuation information, a second movement distance MD2 in which the second member 18 is moved relative to the first member 16 during a second predetermined period. The detector 38 is configured to detect a current position of the second member 18 relative to the first member 16 as a third detected position if the controller 39 concludes that the actuation state is the second abnormal state (Step S14). The controller 39 is configured to control the electrical actuator 19 to move the second member 18 relative to the first member 16 during the second predetermined period if the controller 39 concludes that the actuation state is the second abnormal state (Steps S11 and S15). The controller 39 is configured to control the electrical actuator 19 to stop moving the second member 18 relative to the first member 16 if the second predetermined period elapses after the electrical actuator 19 start to move the second member 18 relative to the first member 16 (Steps S16 and S17).

The controller 39 is configured to increment the second count value CV2 if the second predetermined period elapses (Steps S16 and S18). The controller 39 is configured to store the second count value CV2 in the memory 39B. The controller 39 is configured to replace the second count value CV2 stored in the memory 39B with the second count value CV2 incremented by the controller 39 if the controller 39 increments the second count value CV2.

The controller 39 is configured to control the electrical actuator 19 to move the second member 18 relative to the first member 16 until the second count value CV2 becomes equal to a second count threshold CT2 (Steps S15 to S19). Namely, the controller 39 is configured to control the electrical actuator 19 to repeatedly move the second member 18 relative to the first member 16 if the second count value CV2 is smaller than the second count threshold CT2 (Steps S15 to S19).

As seen in FIG. 9, the detector 38 is configured to detect a current position of the second member 18 relative to the first member 16 as a fourth detected position if the second count value CV2 is equal to or larger than the second count threshold CT2 (Steps S20 and S21). The detector 38 is configured to calculate a different between the third detected position and the fourth detected position as the second movement distance MD2 (Step S21). The controller 39 is configured to store the calculated difference as the second movement distance MD2 in the memory 39B. The controller 39 can be configured to calculate the different between the third detected position and the fourth detected position as the second movement distance MD2.

The controller 39 is configured to evaluate the actuation state is still the second abnormal state if the second movement distance MD2 is out of a second predetermined range (Steps S22 and S23). Namely, the controller 39 is configured to conclude the actuation state is still the abnormal state if the second movement distance MD2 is out of the second predetermined range (Steps S22 and S23). In this embodiment, the second predetermined range includes a minimum value V3 and a maximum value V4. The second predetermined range is defined from the minimum value V3 to the maximum value V4. The controller 39 is configured to evaluate the actuation state as the second abnormal state if the second movement distance MD2 is smaller than the minimum value V3 or larger than the maximum value V4 (Steps S22 and S23). The informing device 54 is configured to inform the user that the rider posture changing device 12 is in the abnormal state if the controller 39 concludes that the actuation state is still the second abnormal state (Step S24). For example, the indicator of the informing device 54 is configured to indicate that the rider posture changing device 12 is in the abnormal state. The indicator is configured to indicate the normal state with a first color. The indicator is configured to indicate a second color different from the first color.

On the other hand, the controller 39 is configured to evaluate the actuation state is not the second abnormal state if the second movement distance MD2 is in the second predetermined range (Steps S22 and S25). Namely, the controller 39 is configured to conclude the actuation state is the normal state if the second movement distance MD2 is in the second predetermined range (Steps S22 and S25). The controller 39 is configured to control the electrical actuator 19 to arrange the second member 18 relative to the first member 16 at a predetermined position if the second movement distance MD2 is in the second predetermined range (Steps S22 and S26). Examples of the predetermined position of the second member 18 relative to the first member 16 includes a top position, a lower position, and a middle position of the second member 18 relative to the first member 16. The process returns to Step S1 after Steps S24 and 26.

Second Embodiment

An actuation system 210 in accordance with a second embodiment will be described below referring to FIGS. 10 to 13. The actuation system 210 has the same structure and/or configuration as that of the actuation system 10 except for the detector 38. Thus, elements having substantially the same function as those in the first embodiment will be numbered the same here and will not be described and/or illustrated again in detail here for the sake of brevity.

Figure 10:
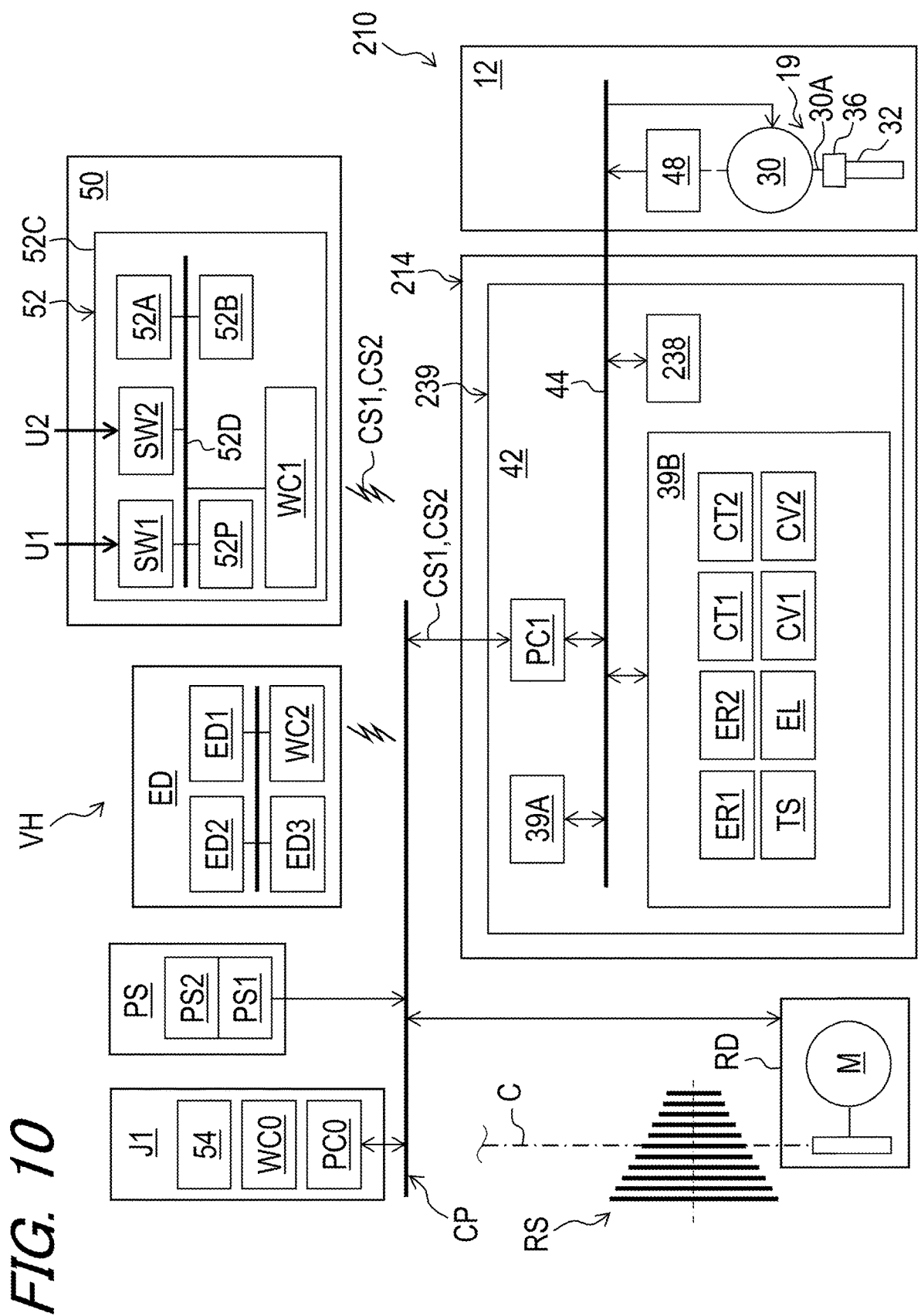
FIG. 10 is a block diagram of an actuation system in accordance with a second embodiment.

As seen in FIG. 10, the actuation system 210 for the human-powered vehicle VH comprises an actuation controller 214 and the rider posture changing device 12. The actuation controller 214 has substantially the same configuration as that of the actuation controller 14. The actuation controller 214 for the rider posture changing device 12 of the human-powered vehicle VH comprises a detector 238 and a controller 239. The detector 238 is configured to detect actuation information relating to the actuation state in which the electrical actuator 19 moves the second member 18 relative to the first member 16. The controller 239 is configured to evaluate the actuation state in accordance with the actuation information detected by the detector 238.

In this embodiment, the actuation information includes the information relating to the electrical actuator 19. For example, the detector 238 is configured to detect electrical-load information of the electrical actuator 19 as the actuation information. The electrical-load information includes one of an electrical power, a voltage, a current, and a temperature of the electrical actuator 19. The controller 239 is configured to evaluate the actuation state as the abnormal state if the electrical-load information is equal to or more than a threshold TS. The controller 239 is configured to store the threshold TS in the memory 39B. Examples of the detector 238 include a watt meter, a voltmeter, an ammeter, and a thermometer.

Figure 11:
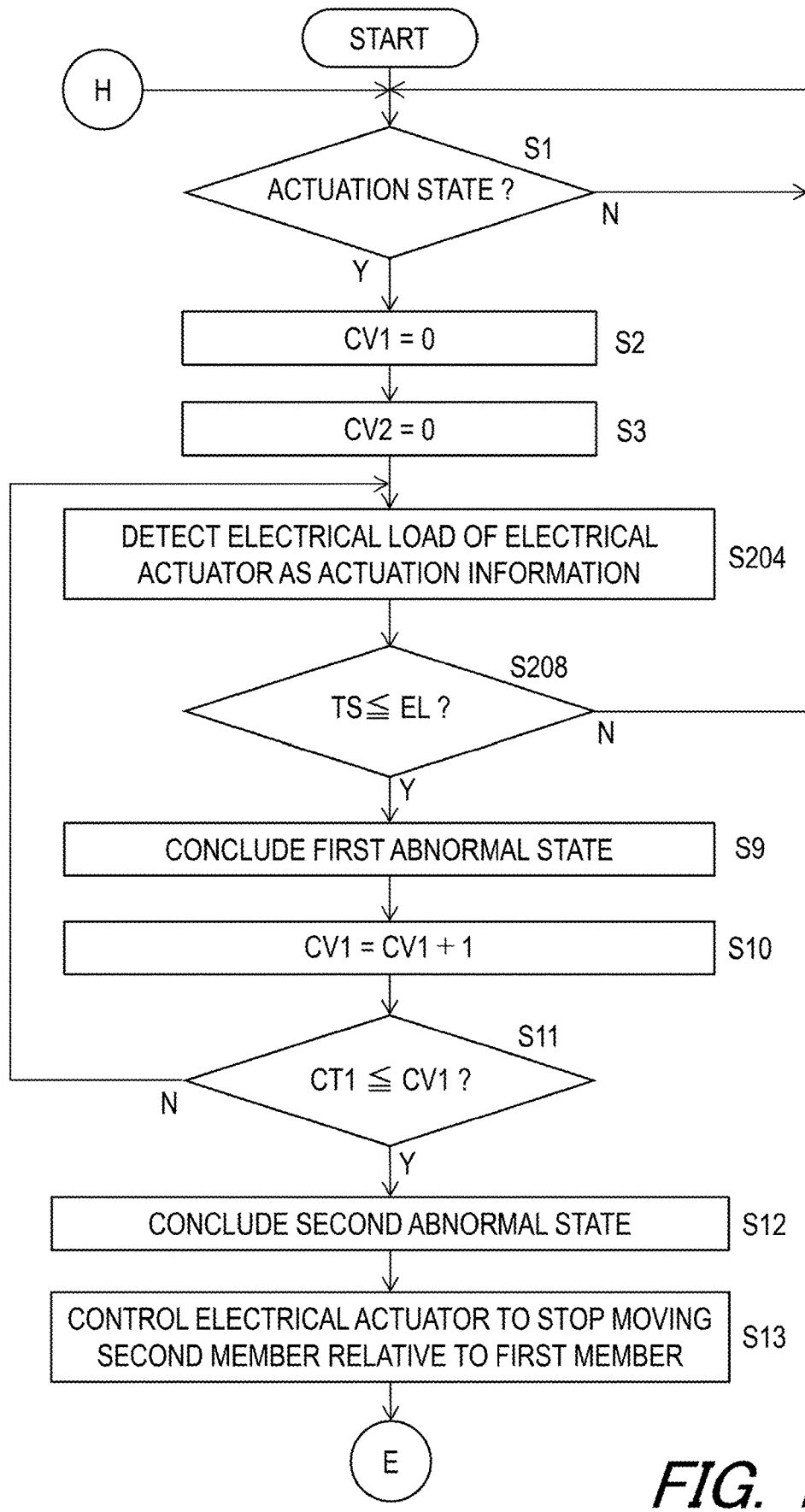
FIGS. 11 to 13 are flow charts of the actuation system illustrated in FIG. 10.

As seen in FIG. 11, the controller 239 is configured to determine whether the rider posture changing device 12 is in the actuation state (Step S1). The controller 239 is configured to reset a first count value CV1 and a second count value CV2 if the rider posture changing device 12 is in the actuation state (Steps S2 and S3).

In the actuation state, the detector 238 is configured to detect an electrical-load information EL of the electrical actuator 19 as the actuation information (Step S204). The controller 239 is configured to evaluate the actuation state as the normal state if the electrical-load information EL is smaller than the threshold TS (Step S208). The process returns to Step S3 if the actuation state is the normal state. The controller 239 is configured to evaluate the actuation state as the abnormal state if the electrical-load information EL is equal to or more than the threshold TS (Step S208). The controller 239 is configured to evaluate the actuation state as the first abnormal state if the electrical-load information EL is equal to or more than the threshold TS (Steps S208 and S9).

The controller 239 is configured to count a first count value CV1 (Step S10). In this embodiment, the controller 239 is configured to increment the first count value CV1 if the controller 239 evaluates the actuation state as the first abnormal state (Steps S208, S9, and S10). The controller 239 is configured not to increment the first count value CV1 as the controller 239 evaluates the actuation state as the normal state (Step S208).

The controller 239 is configured to evaluate whether the actuation state is the second abnormal state based on the first count value CV1 (Step S11). In this embodiment, the controller 239 is configured to evaluate that the actuation state is the second abnormal state if the first count value CV1 is equal to or larger than a first count threshold CT1 (Steps S11 and S12). The controller 239 is configured to control the electrical actuator 19 to stop moving the second member 18 relative to the first member 16 if the controller 239 concludes that the actuation state is the second abnormal state (Steps S11 and S13). On the other hand, the controller 239 is configured to evaluate that the actuation state is not the second abnormal state if the first count value CV1 is smaller than the first count threshold CT1 (Step S11). The process returns to Step S4 if the actuation state is not the second abnormal state. The controller 239 is configured to store the first count threshold CT1 in the memory 39B.

Figure 12:
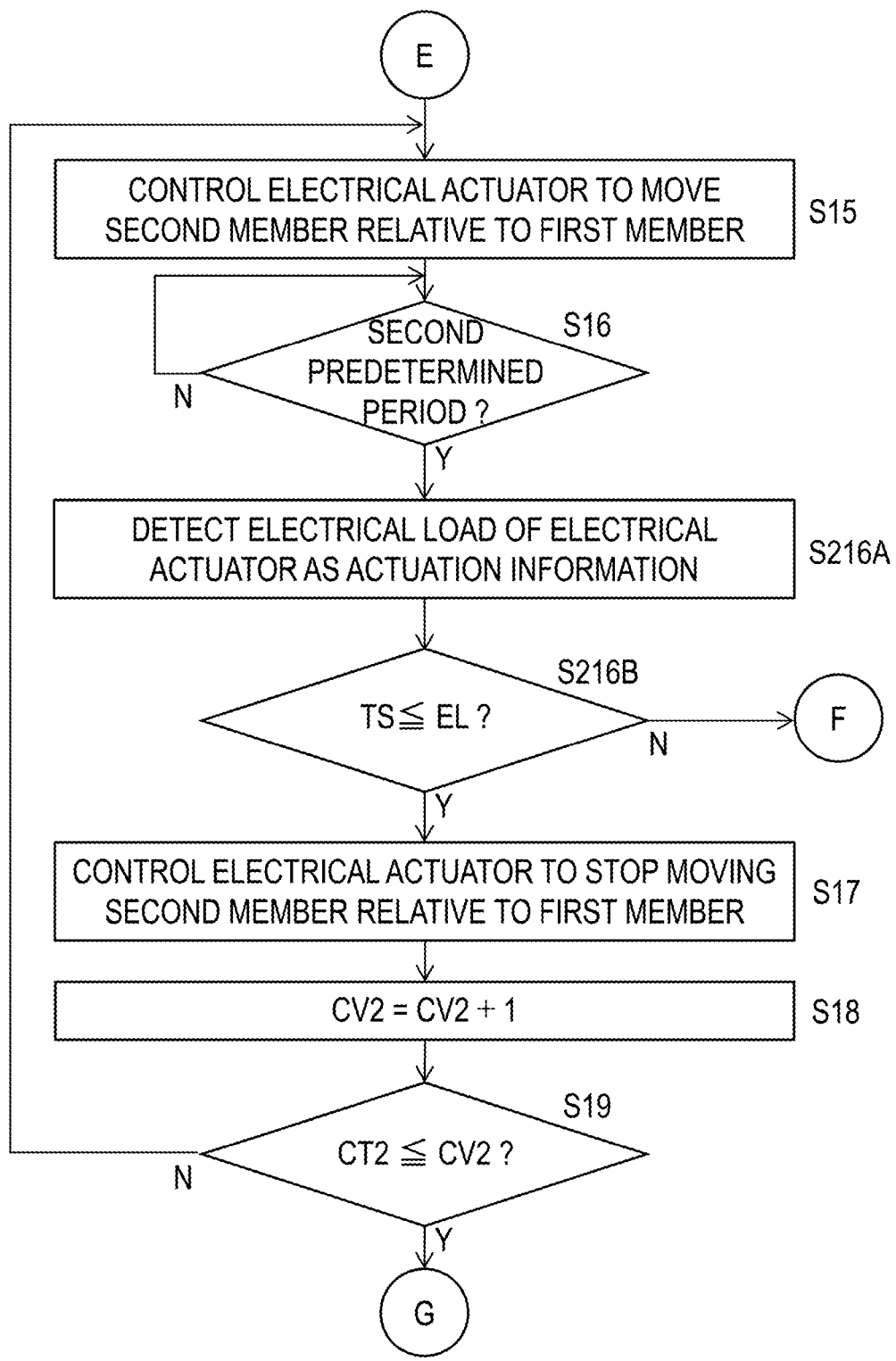

As seen in FIG. 12, the controller 239 is configured to control the electrical actuator 19 to move the second member 18 relative to the first member 16 during the second predetermined period if the controller 239 concludes that the actuation state is the second abnormal state (Steps S11 and S15). The detector 238 is configured to detect an electrical-load information EL of the electrical actuator 19 as the actuation information if the second predetermined period elapses after the electrical actuator 19 start to move the second member 18 relative to the first member 16 (Steps S16 and S216A). The controller 239 is configured to control the electrical actuator 19 to stop moving the second member 18 relative to the first member 16 if the electrical-load information EL is equal to or more than the threshold TS (Steps S216B and S17).

The controller 239 is configured to increment a second count value CV2 if the second predetermined period elapses (Steps S16 and S18). The controller 239 is configured to store the second count value CV2 in the memory 39B. The controller 239 is configured to replace the second count value CV2 stored in the memory 39B with the second count value CV2 incremented by the controller 239 if the controller 239 increments the second count value CV2. The controller 239 is configured to control the electrical actuator 19 to move the second member 18 relative to the first member 16 until the second count value CV2 becomes equal to the second count threshold CT2 if the detected electrical-load information EL is equal to or more than the threshold TS (Steps S15 to S19).

Figure 13:
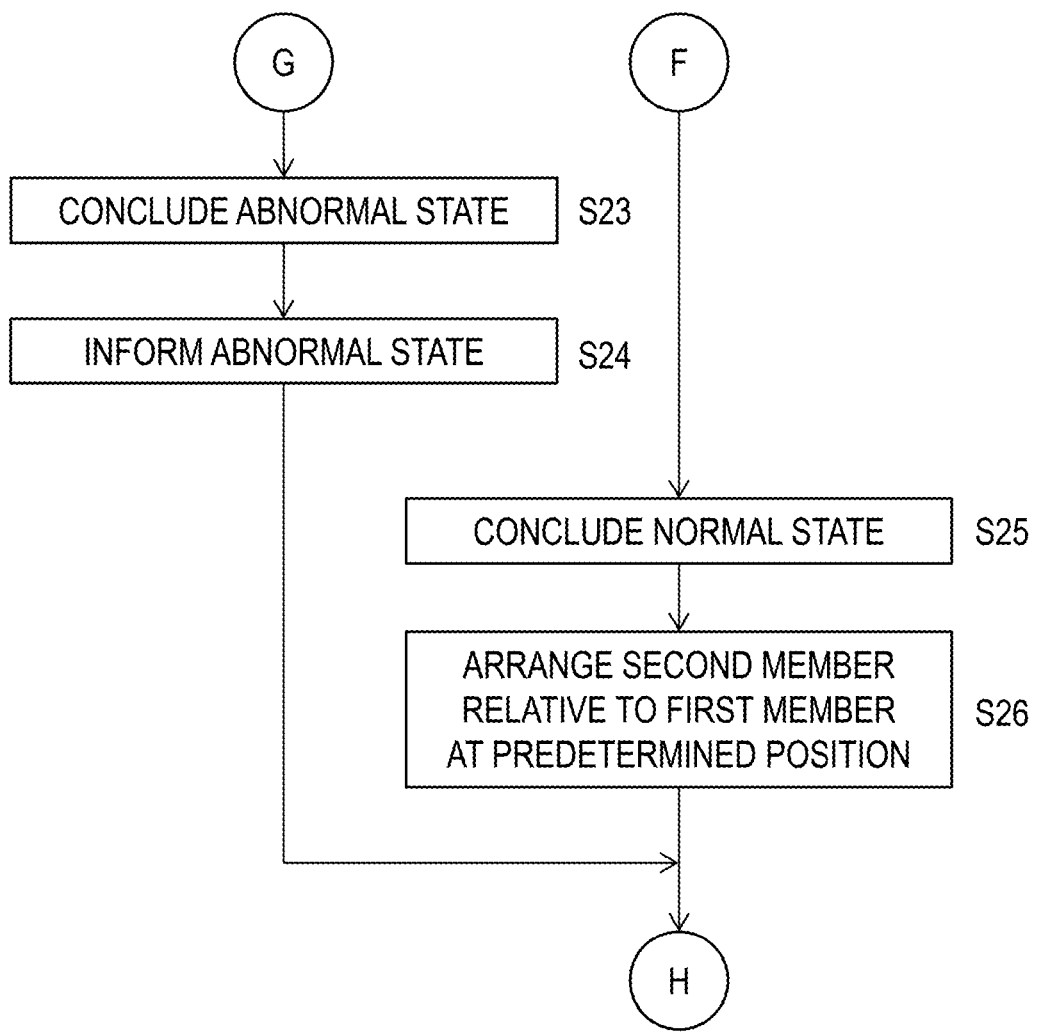

As seen in FIG. 13, the controller 239 is configured to evaluate the actuation state as the second abnormal state if the second count value CV2 is larger than the second count threshold CT2 (Steps S22 and S23). The informing device 54 is configured to inform the user that the rider posture changing device 12 is in the abnormal state if the controller 239 concludes that the actuation state is still the second abnormal state (Step S24).

As seen in FIGS. 12 and 13, the controller 239 is configured to evaluate the actuation state as the normal state if the electrical-load information EL is smaller than the threshold TS (Steps S216B and S25). The controller 239 is configured to control the electrical actuator 19 to arrange the second member 18 relative to the first member 16 at a predetermined position if the actuation state is the normal state (Step S26). The process returns to Step S1 after Steps S24 and 26.

Modifications

In the above embodiments, the actuation controllers 14 and 214 are provided inside the first tube 16T and at a lower part of the first tube 16T. However, at least one of the actuation controllers 14 and 214 can be provided in other positions such that an upper part of the first tube 16T, a lower part and/or an upper part of the second tube 18T, outside of the first tube 16T and/or the second tube 18T, the saddle VH2, the vehicle body VH1, the handlebar VH3, or other any part of the human-powered vehicle VH.

In the above embodiments, the rider posture changing device 12 includes the screw rod 32 operatively connected to the electrical actuator 19. However, the rider posture changing device 12 can include a hydraulic device connected to the electrical actuator 19. In such an embodiment, a rider sitting position detector (e.g., a saddle sensor configured to detect the rider sitting condition) can be provided so as to electrically connected to the controller 39 or 239. The rider sitting position sensor is configured to detect information of the rider's weight. The controller 39 or 239 can be configured to evaluate the actuation state by using the information of the rider's weight without effects of the rider's weight.

In the above embodiments, the controller 39 or 239 is configured to evaluate the actuation state in accordance with the movement distance or the electrical-load information of the actuation information. However, the controller can be configured to evaluate the actuation state in accordance with a combination of both the movement distance and the electrical-load information. In such an embodiment, evaluating order is not limited to a specific order and can as well be changed if needed and/or desired. One or more operating parameters also can be introduced in order to have a better actuation system.

In the above embodiments, the human-powered vehicle VH is a mountain bike. However, the actuation systems 10 and 210 can apply to any type of human-powered vehicles such as a road bike and a gravel bike. In the above embodiments, the operating device 50 is mounted to a flat handlebar. However, the operating device 50 can be mounted to a drop-down handlebar of a road bike or a gravel bike.

In the above embodiments, the rider posture changing device 12 includes the height adjustable seatpost. However, the rider posture changing device 12 is not limited to the height adjustable seatpost. The rider posture changing device 12 can include other devices such as a suspension instead of or in addition to the height adjustable seatpost.

In the above embodiments, the operating device 50 is wirelessly connected to the actuation controller 14. However, the operating device 50 can be connected to the actuation controller 14 with an electric cable. In FIG. 2, for example, the operating device 50 can be connected to the junction J1 with an electric cable.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An actuation controller for a rider posture changing device of a human-powered vehicle, the rider posture changing device including a first member, a second member, and an electrical actuator configured to move the second member relative to the first member, the actuation controller comprising:

a detector configured to detect actuation information relating to an actuation state in which the electrical actuator moves the second member relative to the first member; and a controller configured to evaluate the actuation state in accordance with the actuation information detected by the detector, wherein the detector is configured to detect electrical-load information of the electrical actuator as the actuation information, and the electrical-load information includes one of an electrical power, a current, and a temperature of the electrical actuator.

2. The actuation controller according to claim 1, wherein the controller is configured to evaluate the actuation state as an abnormal state if the electrical-load information is equal to or more than a threshold.

3. The actuation controller according to claim 1, wherein the controller is provided to the rider posture changing device.

4. The actuation controller according to claim 1, further comprising
a wireless communicator.

5. The actuation controller according to claim 1, further comprising
an informing device configured to inform a user of a determination result of the controller.

6. The actuation controller according to claim 1, wherein the first member includes a first tube,
the second member includes a second tube, and
the electrical actuator is configured to move the second tube relative to the first tube.

7. An actuation system for a human-powered vehicle, comprising:
the actuation controller according to claim 1; and
the rider posture changing device.

8. An actuation controller for a rider posture changing device of a human-powered vehicle, the rider posture changing device including a first member, a second member, and an electrical actuator configured to move the second member relative to the first member, the actuation controller comprising:
a detector configured to detect actuation information relating to an actuation state in which the electrical actuator moves the second member relative to the first member; and
a controller configured to evaluate the actuation state in accordance with the actuation information detected by the detector, wherein
the detector is configured to detect, as the actuation information, a first movement distance in which the second member is moved relative to the first member during a first predetermined period,
the controller is configured to evaluate the actuation state as an abnormal state if the first movement distance is out of a first predetermined range,
the abnormal state includes a first abnormal state,
the controller is configured to evaluate the actuation state as the first abnormal state if the first movement distance is out of the first predetermined range,
the controller is configured to count a first count value, and
the controller is configured to increment the first count value if the controller evaluates the actuation state as the first abnormal state.

9. The actuation controller according to claim 8, wherein the abnormal state includes a second abnormal state, and the controller is configured to evaluate whether the actuation state is the second abnormal state based on the first count value.

10. The actuation controller according to claim 9, wherein the controller is configured to evaluate that the actuation state is the second abnormal state if the first count value is equal to or larger than a first count threshold.

11. The actuation controller according to claim 10, wherein
the controller is configured to control the electrical actuator to move the second member relative to the first member during a second predetermined period if the controller concludes that the actuation state is the second abnormal state.

12. The actuation controller according to claim 11, wherein
the controller is configured to control the electrical actuator to stop moving the second member relative to the first member if the second predetermined period elapses after the electrical actuator start to move the second member relative to the first member.

13. The actuation controller according to claim 12, wherein
the controller is configured to increment a second count value if the second predetermined period elapses, and
the controller is configured to control the electrical actuator to move the second member relative to the first member until the second count value becomes equal to a second count threshold.

14. The actuation controller according to claim 12, wherein:
the detector is configured to detect, as the actuation information, a second movement distance in which the second member is moved relative to the first member during the second predetermined period, and
the controller is configured to evaluate the actuation state is still the second abnormal state if the second movement distance is out of a second predetermined range.

15. The actuation controller according to claim 14, wherein
the controller is configured to evaluate the actuation state is not the second abnormal state if the second movement distance is in the second predetermined range.

16. The actuation controller according to claim 14, wherein
the controller is configured to control the electrical actuator to arrange the second member relative to the first member at a predetermined position if the second movement distance is in the second predetermined range.

17. An actuation controller for a rider posture changing device of a human-powered vehicle, the rider posture changing device including a first member, a second member, and an electrical actuator configured to move the second member relative to the first member, the actuation controller comprising:
a detector configured to detect actuation information relating to an actuation state in which the electrical actuator moves the second member relative to the first member; and
a controller configured to evaluate the actuation state in accordance with the actuation information detected by the detector, wherein
the detector is configured to detect electrical-load information of the electrical actuator as the actuation information, and the controller is configured to evaluate the actuation state as an abnormal state if the electrical-load information is equal to or more than a threshold.

\* \* \* \* \*